US012810402B2

(12) United States Patent
Wakatsuki

(10) Patent No.: US 12,810,402 B2
(45) Date of Patent: Nov. 24, 2026

(54) SYSTEMS AND METHODS FOR AUDITING INSPECTION OF IMAGE ANNOTATION QUALITY

(71) Applicant: WOVEN BY TOYOTA, INC., Tokyo (JP)

(72) Inventor: Akira Wakatsuki, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 666 days.

(21) Appl. No.: 18/192,794

(22) Filed: Mar. 30, 2023

(65) Prior Publication Data

US 2024/0331121 A1 Oct. 3, 2024

(51) Int. Cl.
*G06T 7/00* (2017.01)

(52) U.S. Cl.
CPC .. *G06T 7/0002* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 11,277,420 | B2 * | 3/2022 | Côté | G06F 15/76 |
| 11,361,423 | B2 * | 6/2022 | Toth | G06T 7/0004 |
| 11,657,373 | B2 * | 5/2023 | Xiong | G06V 20/17 705/305 |
| 11,792,217 | B2 * | 10/2023 | Côté | G06F 15/76 |
| 2018/0039715 | A1 * | 2/2018 | Vänskä | G06T 9/00 |
| 2018/0248905 | A1 * | 8/2018 | Côté | H04L 43/045 |
| 2018/0350180 | A1 * | 12/2018 | Onischuk | G07C 13/00 |
| 2021/0390342 | A1 * | 12/2021 | Juillard | G06V 10/7784 |
| 2022/0027854 | A1 * | 1/2022 | Yang | G06N 3/08 |
| 2022/0147700 | A1 * | 5/2022 | Yang | G06F 40/169 |
| 2022/0210176 | A1 * | 6/2022 | Côté | H04L 63/1425 |
| 2024/0331120 | A1 * | 10/2024 | Wakatsuki | G06T 7/0002 |
| 2024/0331121 | A1 * | 10/2024 | Wakatsuki | G06T 7/0002 |

* cited by examiner

*Primary Examiner* — Tahmina N Ansari
(74) *Attorney, Agent, or Firm* — Sughrue Mion, PLLC

(57) ABSTRACT

Provided are a method, system, and device for auditing the inspection of image annotation quality in an annotated image dataset. The method may include: obtaining an annotated image dataset; determining, based on a predetermined confidence interval, a predetermined target error ratio, and a predetermined interval width, a minimum number of inspections of the annotated image set; selecting a plurality of frames of the annotated image dataset for inspection based on the minimum number of inspections; and outputting the selected plurality of frames of the annotated image dataset for inspection.

20 Claims, 3 Drawing Sheets

SYSTEMS AND METHODS FOR AUDITING INSPECTION OF IMAGE ANNOTATION QUALITY

TECHNICAL FIELD

Systems and methods consistent with example embodiments of the present disclosure relate to providing a method for auditing image inspection quality for annotated image datasets.

BACKGROUND

Annotated image datasets are used for various Artificial Intelligence (AI) processes, e.g., as training datasets for training computer vision AI models, as evaluation datasets for evaluating AI model performance, etc. In the related art, annotated image datasets provided by image annotators (e.g., third party annotation vendors) are subjected to an annotation quality assurance process prior to being released to an end user or customer (e.g., for training or evaluating the user's AI model). The annotation quality assurance process ascertains any differences between a customer or end user's expectations and a vendor/annotator's understanding, and identifies any annotation errors due to poor or sloppy annotations, human error, etc.

In the related art, a common metric/indicator of the overall quality for annotated image datasets is the error ratio of the sampled population. To this end, randomly selected sample images (differing in time) may be selected, and inspected as much as possible.

For example, if there are 100 frames to be inspected (each taken at a different point in time), 10 frames may be randomly selected as the sample population. If two out of ten of the sample frames are found to have errors, an overall error ratio of 20% may be determined for the overall quality of the annotated image dataset.

However, the degree of statistical data which may be obtained by related art methods of utilizing only an error ratio can be limiting. For example, the actual quality of the population may not be readily shown, or demonstrated to the data user aside from simply the error ratio. Particularly, it may not be clear what the amount of annotations to be inspected should be, in order to obtain a reliable measure of quality. Furthermore, such a method may not be specific about what object should be inspected, which may lead to rare objects being omitted from inspections. Accordingly, such issues may lead to a misinterpretation of the actual quality of the dataset during the auditing process of the dataset, and may lead to instances where the dataset falls below a pre-specified quality demanded by the end user/customer. This may inevitably cause negative impacts on the performance of the AI model and a loss of trust from the end user/customer.

Accordingly, there is a need for a method which can ensure a more accurate dataset and thereby improve training, evaluation, and performance of an AI model.

SUMMARY

According to one or more example embodiments, apparatuses and methods are provided for auditing image inspection quality for annotated image datasets. In particular, apparatuses and methods according to example embodiments calculate the minimum number of inspections required in order to meet a target error ration along with the confidence interval and interval width, such that the inspection quality can be ascertained to the degree specified by the end user/customer. Accordingly, the accuracy of the dataset can be assured, resulting in a more accurate training/evaluation/performance of an AI model.

According to an embodiment, a method for auditing the inspection of image annotation quality in an annotated image dataset may be provided. The method may include: obtaining an annotated image dataset; determining, based on a predetermined confidence interval, a predetermined target error ratio, and a predetermined interval width, a minimum number of inspections of the annotated image set; selecting a plurality of frames of the annotated image dataset for inspection based on the minimum number of inspections; and outputting the selected plurality of frames of the annotated image dataset for inspection.

According to an embodiment outputting the selected plurality of frames for inspection may include: comparing a current number of inspections with the minimum number of inspections; and based on determining that the current number of inspections is less than the minimum number of inspections: outputting an indication of insufficient inspections; and continuing the outputting of the selected plurality of frames until the number of frames inspected is equal to or greater than the minimum number of inspections According to an embodiment, the method may further include: determining, based on the inspection, a number of errors; and calculating, based on the number of errors, a sample error ratio. The method may further include determining, based on the sample error ratio, whether the sample error ratio exceeds the target error ratio; and based on a determination that the sample error ratio exceeds the target error ratio, outputting an indication of bad quality.

According to an embodiment, the indication of bad quality may further include: providing a message to an operator that the quality needs to be improved.

According to an embodiment, the predetermined confidence interval may be one of 99%, 95%, or 90%. The predetermined confidence interval is based on one of a F-distribution or a T-distribution.

According to an embodiment, an apparatus for auditing the inspection of image annotation quality in an annotated image dataset, the apparatus may include: at least one memory storing computer-executable instructions; and at least one processor configured to execute the computer-executable instructions to: obtain an annotated image dataset; determine, based on a predetermined confidence interval, a predetermined target error ratio, and a predetermined interval width, a minimum number of inspections of the annotated image set; select a plurality of frames of the annotated image dataset for inspection based on the minimum number of inspections; and output the selected plurality of frames of the annotated image dataset for inspection.

The at least one processor may be further configured to execute the computer-executable instructions to output the selected plurality of frames for inspection by: comparing a current number of inspections with the minimum number of inspections; and based on determining that the current number of inspections is less than the minimum number of inspections: outputting an indication of insufficient inspections; and continuing the outputting of the selected plurality of frames until the number of frames inspected is equal to or greater than the minimum number of inspections The at least one processor may be further configured to execute the computer-executable instructions to: determine, based on the inspection, a number of errors; and calculate, based on the number of errors, a sample error ratio.

The at least one processor may be further configured to execute the computer-executable instructions to: determine, based on the sample error ratio, whether the sample error ratio exceeds the target error ratio; and based on a determination that the sample error ratio exceeds the target error ratio, output an indication of bad quality.

The at least one processor may be further configured to execute the computer-executable instructions to output the indication of bad quality by: providing a message to an operator that the quality needs to be improved.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The disclosure provides illustration and description, but is not intended to be exhaustive or to limit one or more example embodiments to the precise form disclosed. Modifications and variations are possible in light of the disclosure or may be acquired from practice of one or more example embodiments. Further, one or more features or components of one example embodiment may be incorporated into or combined with another example embodiment (or one or more features of another example embodiment). Additionally, in the flowcharts and descriptions of operations provided herein, it is understood that one or more operations may be omitted, one or more operations may be added, one or more operations may be performed simultaneously (at least in part), and the order of one or more operations may be switched.

It will be apparent that example embodiments of systems and/or methods and/or non-transitory computer readable storage mediums described herein may be implemented in different forms of hardware, firmware, or a combination of hardware and software. The actual specialized control hardware or software code used to implement these systems and/or methods is not limiting of one or more example embodiments. Thus, the operation and behavior of the systems and/or methods and/or non-transitory computer readable storage mediums are described herein without reference to specific software code. It is understood that software and hardware may be designed to implement the systems and/or methods based on the descriptions herein.

Even though particular combinations of features are recited in the claims and/or disclosed in the specification, these combinations are not intended to limit the disclosure of possible example embodiments. In fact, many of these features may be combined in ways not specifically recited in the claims and/or disclosed in the specification. Although each dependent claim listed below may directly depend on only one claim, the disclosure of possible example embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
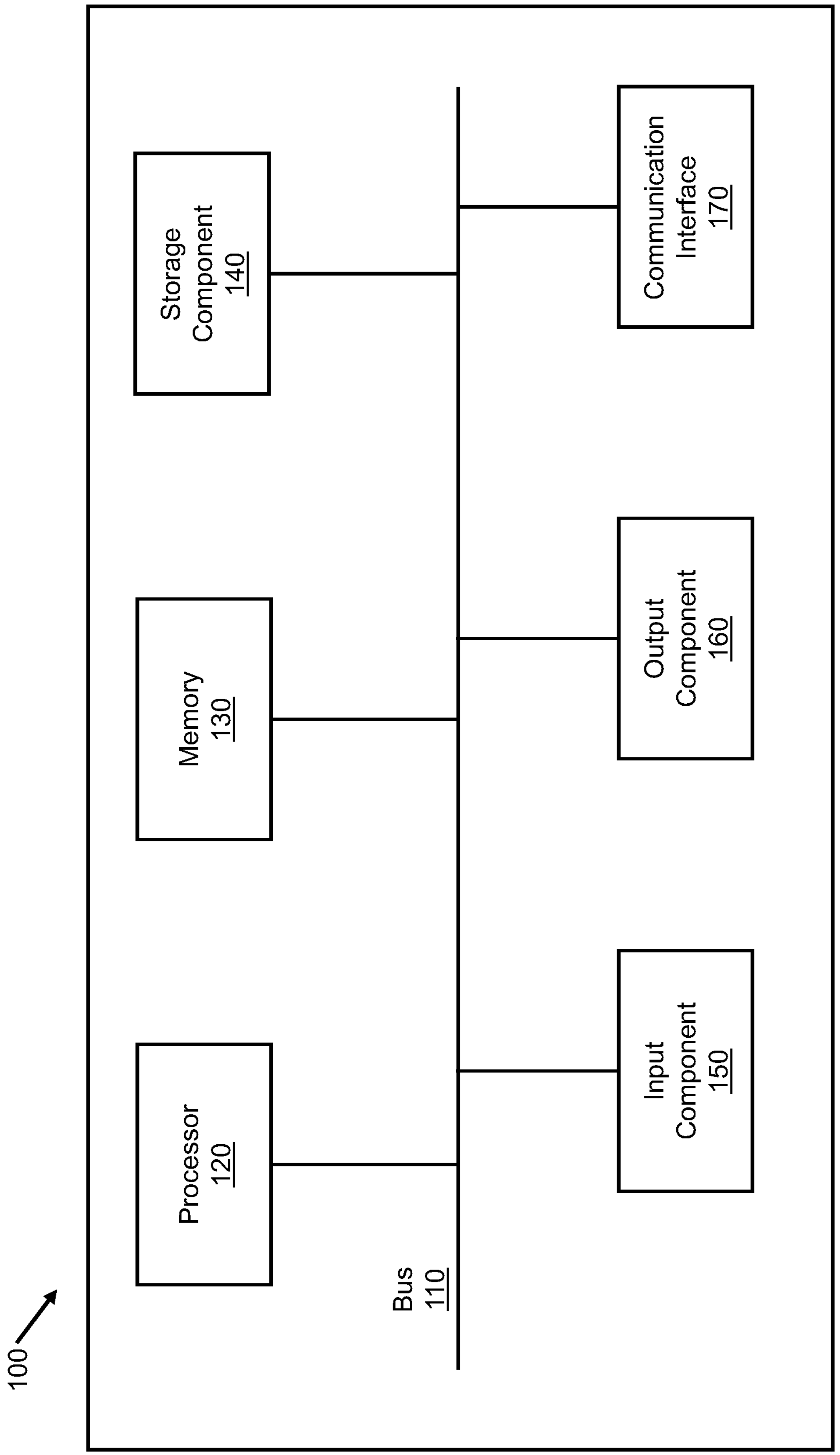
FIG. 1 is a diagram of example components of a device according to an example embodiment.

FIG. 1 is a diagram of example components of an image annotation auditing device 100. As shown in FIG. 1, image annotation auditing device 100 may include a bus 110, a processor 120, a memory 130, a storage component 140, an input component 150, an output component 160, and a communication interface 170.

Bus 110 includes a component that permits communication among the components of image annotation auditing device 100. The processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In one or more example embodiments, the processor 120 includes one or more processors capable of being programmed to perform a function. The memory 130 includes a random access memory (RAM), a read only memory (ROM), and/or another type of dynamic or static storage device (e.g., a flash memory, a magnetic memory, and/or an optical memory) that stores information and/or instructions for use by the processor 220.

Storage component 140 stores information and/or software related to the operation and use of image annotation auditing device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits image annotation auditing device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from image annotation auditing device 100 (e.g., a display, a speaker, and/or one or more light-emitting diodes (LEDs)).

The communication interface 170 includes a transceiver-like component (e.g., a transceiver and/or a separate receiver and transmitter) that enables image annotation auditing device 100 to communicate with other devices, such as via a wired connection, a wireless connection, or a combination of wired and wireless connections. The communication interface 170 may permit the image annotation auditing device 100 to receive information from another device and/or provide information to another device. For example, the communication interface 170 may include, but is not limited to, an Ethernet interface, an optical interface, a coaxial interface, an infrared interface, a radio frequency (RF) interface, a universal serial bus (USB) interface, a Wi-Fi interface, a cellular network interface, or the like.

The image annotation auditing device 100 may perform one or more example processes described herein. According to one or more example embodiments, the image annotation auditing device 100 may perform these processes in response to the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 170. When executed, software instructions stored in the memory 130 and/or the storage component 140 may cause the processor 120 to perform one or more processes described herein.

Additionally, or alternatively, hardwired circuitry may be used in place of, or in combination with, software instructions to perform one or more processes described herein. Thus, one or more example embodiments described herein are not limited to any specific combination of hardware circuitry and software.

The number and arrangement of components shown in FIG. 1 are provided as an example. In practice, the image annotation auditing device 100 may include additional components, fewer components, different components, or differently arranged components than those shown in FIG. 1. Additionally, or alternatively, a set of components (e.g., one or more components) of the image annotation auditing device 100 may perform one or more functions described as being performed by another set of components of the image annotation auditing device 100.

Figure 2:
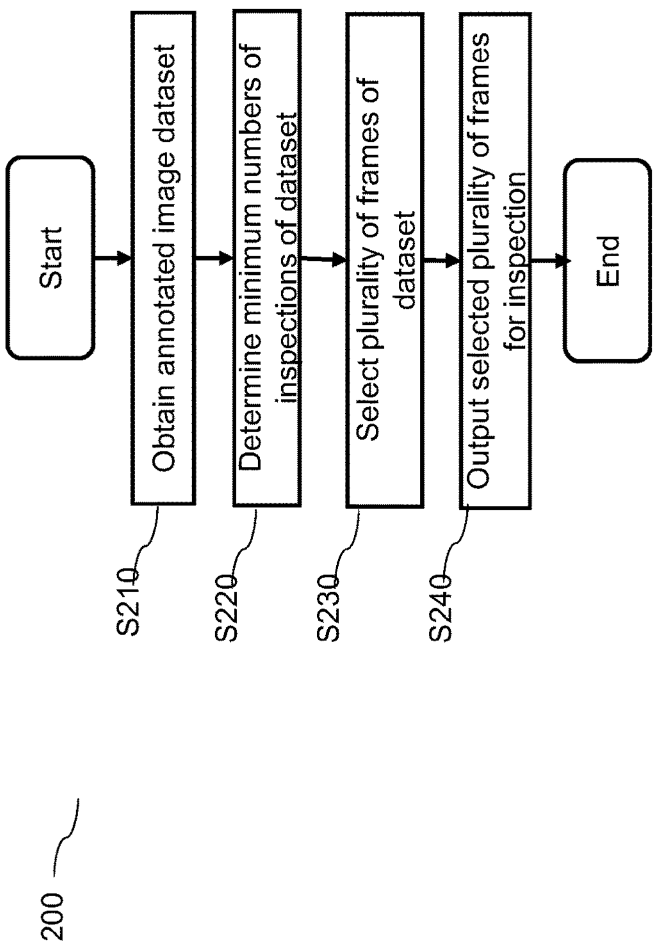
FIG. 2 is a flowchart diagram showing an annotated image inspection auditing process according to one or more example embodiments.

FIG. 2 is a diagram showing an annotated image inspection quality auditing process 200 according to one or more example embodiments.

Referring to FIG. 2, at operation S210, an annotated image dataset may be obtained. It should be noted that according to some embodiments, the annotated image dataset may already have been provided. The annotated image dataset may be obtained with any appropriate method according to embodiments.

At operation S220, a minimum number of inspections of the annotated image dataset obtained in operation S210 may be determined. According to an embodiment, the minimum number of inspections may be determined based on a confidence interval, a target error ratio, and an interval width.

The confidence interval may be calculated/pre-determined prior to the inspection, according to an embodiment. In particular, the confidence interval should be understood as an interval in which there is a specified probability that the value of a parameter within the dataset lies within it. According to some embodiments, the confidence interval may be 95%, but it should be appreciated that other values (99%, 90%, etc.) may be used according to embodiments.

It should be appreciated that the confidence interval above can be based on either a standard T distribution, or a F distribution. For example, one skilled in the art may appreciate that a standard T distribution is more useful in scenarios where there is a larger sample size, whereas a F distribution is more useful in scenarios where there is a smaller sample size, or the expected error rate is unknown.

The desired target error ratio may be a value which is requested by the end user (e.g., the customer), or it may be set by default. This may typically be 5% in the instance where high accuracy is not required, and may be 1% in the instance where high accuracy is required, nevertheless these are simply reference values, and it should be appreciated that any target error ratio can be specified.

A (confidence) interval width may also be calculated/predetermined prior to the inspection, according to an embodiment. In particular, the interval width may be defined as the size between the upper and lower bounds of a given class in a distribution. This may be typically given as an uncertainty percentage value (e.g., +/−2.5%, +/−5%, etc.) but it should be appreciated that any other format of representing the interval width may be given.

Based on the confidence interval, the target error ratio, and the interval width, the minimum number of inspections may be readily determined. In particular, according to one embodiment, a calculation based on a T-distribution may be used.

An example of a calculation used to obtain the confidence interval in the case of a T distribution may be given based on the following formula (1)

$$\varphi - g(n-1, 1-\alpha)x\sqrt{\frac{\varphi(1-\varphi)}{n}} \leq p \leq \varphi + g(n-1, 1-\alpha)x\sqrt{\frac{\varphi(1-\varphi)}{n}} \quad (1)$$

Wherein:

φ is the target error ratio p is a given population error ratio (i.e., the expected likelihood there is an error in the data)

n is the total number of samples

α is the significance level (i.e., a value indicating whether the error is statistically significant or not, typically 5%)

g(n−1,1−α) is the binominal probability distribution function from n−1 to 1−α

An example of a calculation used to obtain the confidence interval width β in a T distribution is given by the following formula (2)

$$\beta = 2xg(n-1, 1-\alpha)x\sqrt{\frac{\varphi(1-\varphi)}{n}} \quad (2)$$

An example of a calculation used to obtain the target number of samples n' in a T-distribution is given by the following formula (3)

$$n' \geq \left(\frac{(2xg(k-1, 1-\alpha)x\sqrt{(\varphi(1-\varphi))}}{\beta}\right)^2 \quad (3)$$

Nevertheless, it should be understood that any appropriate method for calculating the confidence interval, the confidence interval width, and the target number of samples may be used, according to embodiments.

Based on the above embodiments, one skilled in the art may also appreciate that the confidence interval and interval width may be determined based on the parameters of significance level $\alpha$ and given population error ratio p, and vice-versa. In any event, the above embodiment exemplifies how the target/minimum number of samples to be inspected (e.g. n') may be determined based on a confidence interval width and the confidence interval based on a T distribution. It should be appreciated that similar methods and calculations may be used in the case of using an F distribution or other types of frequency distributions.

Referring back to FIG. 2, at operation S230, the plurality of frames of the dataset may be selected for inspection based on the minimum number of inspections determined in operation S220. According to one embodiment, the population from the original dataset may be segmented based on the target/minimum number of samples to be inspected.

At operation S240, the selected frames in operation S230 may be outputted for inspection. According to an embodiment, the inspection may proceed to inspect each frame for errors for each frame which was selected, based on the target/minimum number of samples to be inspected. According to one embodiment, this may be on a frame by frame basis. The inspection may keep track of the current number of frames which have actually been inspected, relative to the target/minimum number of samples. If it is determined that the number of samples of frames which have been inspected is less than the required target/minimum number of samples, the process may output an indication (e.g., a message to the operator/inspector) that there are insufficient inspections. Thereafter, the inspection may continue (e.g., frames may continue being outputted) until the number of frames inspected is equal or greater than the minimum number of inspections.

Figure 3:
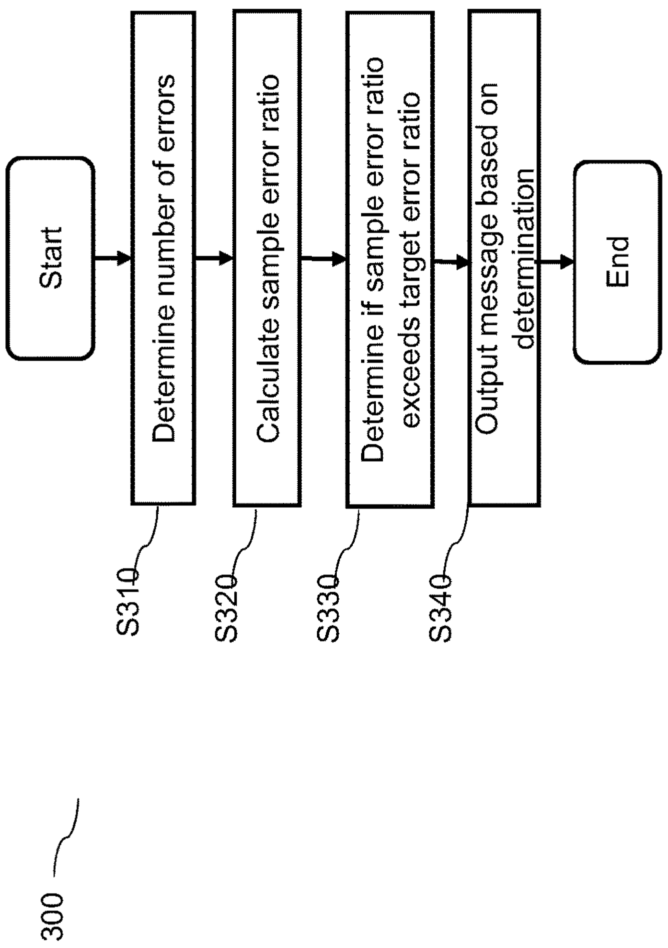
FIG. 3 is a flowchart diagram showing an annotated image inspection result evaluation process according to one or more example embodiments.

FIG. 3 illustrates an example flowchart showing an annotated image inspection result evaluation process 300 according to one or more example embodiments. Annotated image inspection result evaluation process 300 may be performed after the steps illustrated in FIG. 2, or separately from the steps illustrated in FIG. 2.

At operation S310, the number of errors is determined. This may be based on aggregating the number of errors from the inspection in operation S240 from FIG. 2 above, or provided through some other process according to some embodiments.

At operation S320, based on the number of errors, a sample error rate may be determined. For example, it may be obtained by comparing the number of errors to the numbers of samples inspected.

At operation S330, it may be determined as to whether the sample error rate exceeds the target error ratio (e.g., the target error ration used in operation S220 with reference to FIG. 2 above). If the sample error ratio is greater than the target error ratio, this may indicate that the quality of the dataset is below the end user/customer's desired target error ratio.

At operation S340, a message may be output to the user based on the determination in operation S330. For example, a message may indicate that the dataset is low quality. According to some embodiments, this may further include indicating that some corrective action should be taken by the operator/inspector. For example, by at least sending a message to the operator/inspector that the image annotations should be redone, and re-audited at a later date, nevertheless it should be appreciated that any appropriate corrective action can be taken. Nevertheless, it should be appreciated that the indication may not necessarily be in the form of a message, but may be some simple visual indicator (e.g., a color).

Based on the above embodiments, it can be understood that by calculating the minimum number of inspections required in order to meet a target error ratio along with the confidence interval and interval width, the inspection quality can be ascertained to the degree specified by the end user/customer. Accordingly, the accuracy of the dataset can be assured, resulting in a more accurate training/evaluation/performance of an AI model.

The foregoing disclosure provides illustration and description, but is not intended to be exhaustive or to limit one or more example embodiments to the precise form disclosed. Modifications and variations are possible in light of the disclosure or may be acquired from practice of one or more example embodiments.

One or more example embodiments may relate to a system, a method, and/or a computer readable medium at any possible technical detail level of integration. Further, one or more of the components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more example embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible example embodiments of systems, methods, and computer readable media according to one or more example embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the drawings. In one or more alternative example embodiments, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of one or more example embodiments. Thus, the operation and behavior of the systems and/or methods were described herein without reference to specific software code—it being understood that software and hardware may be designed to implement the systems and/or methods based on the description herein.

What is claimed is:

1. A method for auditing the inspection of image annotation quality in an annotated image dataset, the method comprising:

- obtaining an annotated image dataset;
- determining a predetermined confidence interval based on a probability distribution, wherein the predetermined confidence interval is calculated based on a population error ratio and a significance level, the population error ratio indicates an expected likelihood an error exists within the annotated image dataset, and the significance level indicates whether the error is statistically significant;
- determining a predetermined interval width representing a size between upper and lower bounds of the predetermined confidence interval;
- determining a target number of samples within the probability distribution based on the predetermined confidence interval, a predetermined target error ratio, and the predetermined interval width, wherein the predetermined target error ratio indicates an acceptable error rate for the annotated image dataset, and the predetermined target error ratio is set by default or requested by an end user;
- determining, a minimum number of inspections of the annotated image set based on the target number of samples within the probability distribution;
- selecting a plurality of frames of the annotated image dataset for inspection based on the minimum number of inspections; and
- outputting the selected plurality of frames of the annotated image dataset for inspection.

2. The method according to claim 1, wherein the outputting the selected plurality of frames for inspection comprises:

- comparing a current number of inspections with the minimum number of inspections; and
- based on determining that the current number of inspections is less than the minimum number of inspections:
  - outputting an indication of insufficient inspections; and
  - continuing the outputting of the selected plurality of frames until the number of frames inspected is equal to or greater than the minimum number of inspections.

3. The method according to claim 1, further comprising:

determining, based on the inspection, a number of errors; and calculating, based on the number of errors, a sample error ratio.

4. The method according to claim 3, further comprising:

determining, based on the sample error ratio, whether the sample error ratio exceeds the target error ratio; and based on a determination that the sample error ratio exceeds the target error ratio, outputting an indication of bad quality.

5. The method according to claim 4, wherein the outputting the indication of bad quality further comprises:

providing a message to an operator that the quality needs to be improved.

6. The method according to claim 1, wherein the predetermined confidence interval is one of 99%, 95%, or 90%.

7. The method according to claim 1, wherein the predetermined confidence interval is based on one of a F-distribution or a T-distribution.

8. An apparatus for auditing the inspection of image annotation quality in an annotated image dataset, the apparatus comprising:

at least one memory storing computer-executable instructions; and at least one processor configured to execute the computer-executable instructions to:

obtain an annotated image dataset;

determine a predetermined confidence interval based on a probability distribution, wherein the predetermined confidence interval is calculated based on a population error ratio and a significance level, the population error ratio indicates an expected likelihood an error exists within the annotated image dataset, and the significance level indicates whether the error is statistically significant;

determine a predetermined interval width representing a size between upper and lower bounds of the predetermined confidence interval;

obtaining a target number of samples within the probability distribution based on the predetermined confidence interval, a predetermined target error ratio, and the predetermined interval width, wherein the predetermined target error ratio indicates an acceptable error rate for the annotated image dataset, and the predetermined target error ratio is set by default or requested by an end user;

determine, a minimum number of inspections of the annotated image set based on the target number of samples within the probability distribution;

select a plurality of frames of the annotated image dataset for inspection based on the minimum number of inspections; and output the selected plurality of frames of the annotated image dataset for inspection.

9. The apparatus according to claim 8, wherein the at least one processor is further configured to execute the computer-executable instructions to output the selected plurality of frames for inspection by:

comparing a current number of inspections with the minimum number of inspections; and based on determining that the current number of inspections is less than the minimum number of inspections: outputting an indication of insufficient inspections; and continuing the outputting of the selected plurality of frames until the number of frames inspected is equal to or greater than the minimum number of inspections.

10. The apparatus according to claim 8, wherein the at least one processor is further configured to execute the computer-executable instructions to:

determine, based on the inspection, a number of errors; and calculate, based on the number of errors, a sample error ratio.

11. The apparatus according to claim 10, wherein the at least one processor is further configured to execute the computer-executable instructions to:

determine, based on the sample error ratio, whether the sample error ratio exceeds the target error ratio; and based on a determination that the sample error ratio exceeds the target error ratio, output an indication of bad quality.

12. The apparatus according to claim 11, wherein the at least one processor is further configured to execute the computer-executable instructions to output the indication of bad quality by:

providing a message to an operator that the quality needs to be improved.

13. The apparatus according to claim 8, wherein the predetermined confidence interval is one of 99%, 95%, or 90%.

14. The apparatus according to claim 8, wherein the predetermined confidence interval is based on one of a F-distribution or a T-distribution.

15. A non-transitory computer-readable recording medium having recorded thereon instructions executable by at least one processor to cause the processor to perform a method comprising:

obtaining an annotated image dataset;

determining a predetermined confidence interval based on a probability distribution, wherein the predetermined confidence interval is calculated based on a population error ratio and a significance level, the population error ratio indicates an expected likelihood an error exists within the annotated image dataset, and the significance level indicates whether the error is statistically significant;

determining a predetermined interval width representing a size between upper and lower bounds of the predetermined confidence interval;

obtaining a target number of samples within the probability distribution based on the predetermined confidence interval, a predetermined target error ratio, and the predetermined interval width, wherein the predetermined target error ratio indicates an acceptable error rate for the annotated image dataset, and the predetermined target error ratio is set by default or requested by an end user;

determining, a minimum number of inspections of the annotated image set based on the target number of samples within the probability distribution;

selecting a plurality of frames of the annotated image dataset for inspection based on the minimum number of inspections; and outputting the selected plurality of frames of the annotated image dataset for inspection.

16. The non-transitory computer-readable recording medium according to claim 15, wherein the outputting the selected plurality of frames for inspection comprises:

comparing a current number of inspections with the minimum number of inspections; and based on determining that the current number of inspections is less than the minimum number of inspections:

outputting an indication of insufficient inspections; and continuing the outputting of the selected plurality of frames until the number of frames inspected is equal to or greater than the minimum number of inspections.

17. The non-transitory computer-readable recording medium according to claim 15, wherein the method further comprises:

determining, based on the inspection, a number of errors; and calculating, based on the number of errors, a sample error ratio.

18. The non-transitory computer-readable recording medium according to claim 17, further comprising:

determining, based on the sample error ratio, whether the sample error ratio exceeds the target error ratio; and based on a determination that the sample error ratio exceeds the target error ratio, outputting an indication of bad quality.

19. The non-transitory computer-readable recording medium according to claim 18, wherein the outputting the indication of bad quality further comprises:

providing a message to an operator that the quality needs to be improved.

20. The non-transitory computer-readable recording medium according to claim 15, wherein the predetermined confidence interval is one of 99%, 95%, or 90%.

* * * * *